US012640601B2

(12) United States Patent
Jiang

(10) Patent No.: US 12,640,601 B2
(45) Date of Patent: May 26, 2026

(54) FLAT-TYPE EFFECT MODULE AND STAGE LIGHT FIXTURE WITH SAME

(71) Applicant: Guangzhou Haoyang Electronic Co., Ltd., Guangzhou (CN)

(72) Inventor: Weikai Jiang, Guangzhou (CN)

(73) Assignee: GUANGZHOU HAOYANG ELECTRONIC CO., LTD., Guangzhou (CN)

( * ) Notice: Subject to any disclaimer, the term of this patent is extended or adjusted under 35 U.S.C. 154(b) by 484 days.

(21) Appl. No.: 18/086,821

(22) Filed: Dec. 22, 2022

(65) Prior Publication Data

US 2023/0126965 A1     Apr. 27, 2023

Related U.S. Application Data

(63) Continuation of application No. PCT/CN2021/109544, filed on Jul. 30, 2021.

(30) Foreign Application Priority Data

Dec. 28, 2020     (CN) .......................... 202011579311.X

(51) Int. Cl.
| | |
|---|---|
| *H02K 1/22* | (2006.01) |
| *F21S 10/00* | (2006.01) |
| *F21V 14/00* | (2018.01) |
| *F21V 14/08* | (2006.01) |
| *H02K 1/12* | (2006.01) |
| *H02K 1/2706* | (2022.01) |

(Continued)

(52) U.S. Cl.
CPC .............. *H02K 1/12* (2013.01); *F21S 10/007* (2013.01); *F21V 14/08* (2013.01); *H02K 1/22* (2013.01);

(Continued)

(58) Field of Classification Search
CPC .. H02K 1/2786; H02K 1/2787; H02K 1/2789; H02K 1/12; H02K 1/22;

(Continued)

(56) References Cited

U.S. PATENT DOCUMENTS

| | | | | |
|---|---|---|---|---|
| 4,891,738 A | * | 1/1990 | Richardson | ........... F21S 10/007 362/284 |
| 5,113,332 A | * | 5/1992 | Richardson | ........... F21S 10/007 362/284 |

(Continued)

FOREIGN PATENT DOCUMENTS

| | | |
|---|---|---|
| CN | 2422195 Y | 3/2001 |
| CN | 104201821 A | 12/2014 |

(Continued)

*Primary Examiner* — Edgardo San Martin
(74) *Attorney, Agent, or Firm* — MUNCY, GEISSLER, OLDS & LOWE, P.C.

(57)     ABSTRACT

A flat-type effect module includes a first flat motor and an effect wheel assembly. The first flat motor has a first stator to generate a magnetic field when energized, and a first rotor arranged outside the first stator in a sleeving mode. The effect wheel assembly is fixed to the first rotor, and the effect wheel assembly includes a wheel body for generating a light effect which is provided with effect areas for intercepting a light beam to change the color and/or shape thereof. According to the present invention, no rotating shaft, such as the traditional rotating shaft motor has, exists on the first flat motor, the effect wheel assembly in the present invention is directly fixed to the first rotor, so that the height of the rotating shaft can be reduced and more effect elements can be arranged.

20 Claims, 5 Drawing Sheets

(51) Int. Cl.

| | |
|---|---|
| *H02K 7/00* | (2006.01) |
| *H02K 7/08* | (2006.01) |
| *H02K 7/14* | (2006.01) |
| *H02K 21/22* | (2006.01) |
| *F21W 131/406* | (2006.01) |

(52) U.S. Cl.
CPC ........... *H02K 1/2706* (2013.01); *H02K 7/003* (2013.01); *H02K 7/08* (2013.01); *H02K 7/088* (2013.01); *H02K 7/14* (2013.01); *H02K 21/22* (2013.01); *F21W 2131/406* (2013.01)

(58) Field of Classification Search
CPC ........... H02K 1/27; H02K 7/00; H02K 7/003; H02K 7/08; H02K 7/085; H02K 7/088; H02K 7/10; H02K 7/14; H02K 7/116; H02K 21/22; F21S 10/007; F21S 10/00; F21V 14/00; F21V 14/08; F21W 2131/406
See application file for complete search history.

(56) References Cited

U.S. PATENT DOCUMENTS 8,752,985 B2 * 6/2014 Quadri .................. F21S 10/007
359/813

| | | | | |
|---|---|---|---|---|
| 11,112,078 B2 * | 9/2021 | Jiang | ...................... | F21S 10/007 |
| 11,209,140 B2 * | 12/2021 | Jiang | ...................... | F21V 14/08 |
| 11,255,502 B2 * | 2/2022 | Jiang | ...................... | F21S 10/007 |
| 11,313,374 B2 * | 4/2022 | Lee | ...................... | F04D 25/088 |
| 11,320,118 B2 * | 5/2022 | Jiang | ...................... | F21V 14/08 |
| 2006/0061992 A1 | 3/2006 | Belousova et al. | | |
| 2014/0226336 A1 * | 8/2014 | Chi | .......................... | F21K 9/65 |
| | | | | 362/280 |

FOREIGN PATENT DOCUMENTS

| | | | | | | |
|---|---|---|---|---|---|---|
| CN | 205017144 U | * | 2/2016 | | | |
| CN | 205782602 U | * | 12/2016 | | | |
| CN | 206571947 U | * | 10/2017 | | | |
| CN | 206771249 U | * | 12/2017 | | | |
| CN | 208282001 U | * | 12/2018 | | ............. | F21S 10/02 |
| CN | 208295780 U | | 12/2018 | | | |
| CN | 106300855 B | * | 2/2019 | | ............ | H02K 21/24 |
| CN | 208703819 U | * | 4/2019 | | | |
| CN | 209101192 U | * | 7/2019 | | | |
| CN | 112539390 A | * | 3/2021 | | ............ | F21S 10/007 |
| CN | 612615443 A | | 4/2021 | | | |
| CN | 214227963 U | | 9/2021 | | | |
| CN | 114017737 A | * | 2/2022 | | | |
| GB | 424619 A | * | 2/1935 | | | |
| GB | 2305497 A | * | 4/1997 | | ............ | F21S 10/007 |
| KR | 20080045981 A | * | 5/2008 | | | |
| KR | 20220051343 A | * | 4/2022 | | | |

* cited by examiner

FLAT-TYPE EFFECT MODULE AND STAGE LIGHT FIXTURE WITH SAME

CROSS REFERENCE TO RELATED APPLICATIONS

The present application is a continuation of International Application No. PCT/CN2021/109544, filed on Jul. 30, 2021, which claims priority from Chinese Invention Application No. 202011579311.X filed on Dec. 28, 2020, all of which are hereby incorporated herein by reference.

TECHNICAL FIELD

The present invention relates to the technical field of stage lights, and more particularly, relates to a flat-type effect module and a stage light fixture with the same.

BACKGROUND

As important equipment for rendering atmosphere, stage light fixtures are widely used in various venues. In order to improve rendering effects, the stage light fixture is typically provided with different kinds of effect wheels to generate various light effects, which effect wheels are generally arranged close to the focus of a light source of the stage light fixture. However, the position close to the focus of the light source is too limited to simultaneously arrange a plurality of effect wheels.

In addition, the effect wheel is usually fixed on a long and thin pivot shaft and driven by a motor via a belt or gear, or is directly fixed on a rotating shaft of a rotating shaft motor. On the one hand, the pivot shaft and the rotating shaft of the motor will take up much space in the direction perpendicular to the effect wheel, and on the other hand, the rotating shaft motor itself will also take up some space due to its thickness. As a result, with such configuration, effect wheels disposed close to the focal position of the light source are restricted in number, which will cause poor light effects of the stage light fixture.

SUMMARY

Accordingly, the present invention provides a flat-type effect module and a light fixture, without rotating shaft of a motor and with lowered thickness of the motor, which can provide more effect wheels at the focal position of a light source, thus can achieve richer and more marvelous effects of the stage light fixture.

In one aspect, a flat-type effect module is provided according to the present invention, which includes a first flat motor and an effect wheel assembly driven by the first flat motor. The first flat motor has a first stator which can generate a magnetic field when energized, and a first rotor which is arranged outside the first stator in a sleeving mode and can be driven by the magnetic field. The effect wheel assembly is fixed to the first rotor. The effect wheel assembly includes a wheel body for generating a light effect, which wheel body has a plurality of effect areas for intercepting a light beam to change the color and/or shape thereof.

According to the present invention, no rotating shaft, such as the traditional rotating shaft motor has, exists on the first flat motor, the effect wheel assembly in the present invention is directly fixed to the first rotor, so that the height of the rotating shaft can be reduced. Therefore, with the configuration of the flat motor the flat-type effect module according to the present invention will take up less height space, so that more effect wheels can be arranged at the focal position of a light source, thereby achieving richer light effects of the stage light fixture.

On the other hand, the first rotor is arranged outside the first stator in a sleeving mode, compared with a traditional rotating shaft motor, more permanent magnets can be provided on the first rotor, so that even if the height of each permanent magnet is reduced, power of the motor will not change as the number of the permanent magnets increases, thereby achieving a reduction in the thickness of the motor itself to take up less height space and maintaining power required.

According to at least one embodiment of the present invention, the first stator includes a first core column and a first winding wound outside the first core column. The first core column has a through hole in the length direction. A cable for transmitting power or signals can pass through the through hole, which can facilitate mounting and arranging of the cable.

A raised edge for bearing the effect wheel assembly can be formed on the first rotor, and the outer diameter of the raised edge is greater than the outer diameter of the first rotor. With such configuration, the effect wheel assembly is fixed to the raised edge, and the height of the effect wheel assembly can be flexibly adjusted by changing the position of the raised edge without being limited to the end face of the effect wheel assembly. The outer diameter of the raised edge is greater than the outer diameter of the first rotor, so that the effect wheel assembly is fixed more stably and will be not prone to waggling relative to the first rotor.

In order to make the rotation of the effect wheel assembly smoother and more stable, the first rotor is preferably configured to support the effect wheel assembly around the center of rotation of the effect wheel assembly. In such way, the first rotor can support the effect wheel assembly around the center of rotation of the effect wheel assembly for one full circle.

Preferably, the wheel body is directly fixed to the first rotor and the first rotor drives the wheel body to rotate on its own. The first rotor drives the wheel body to rotate on its own, so that different effect areas or different parts of each effect area on the wheel body can intercept the light beam to generate different light effects. The wheel body can be a fixed pattern wheel, a color wheel, a CMY wheel or a frosting wheel.

According to at least one embodiment of the present invention, the effect wheel assembly can further include a bearing plate. The wheel body is pivotally connected to the bearing plate, and the bearing plate is fixed to the first rotor, so that the first rotor can drive the wheel body to revolve. In such configuration, the first rotor can drive the wheel body to move to different positions via the bearing plate, so that the wheel body can be switched in/out of the light path, or different effect areas or different parts of each effect area on the wheel body can intercept the light beam. For example, the wheel body may be a fire wheel or a prism.

Another first flat motor can be fixed to the bearing plate, and the wheel body is fixed to the first rotor of the another first flat motor. The wheel body combining with the another first flat motor has the characteristics of small height, and smooth and stable rotation.

According to at least one embodiment of the present invention, a second flat motor can be included. The second flat motor has a second stator which can generate a magnetic field when energized, and a second rotor which is arranged outside the second stator in a sleeving mode and can be driven by the magnetic field. The second stator is stacked with the first stator, and the second rotor is connected to a driving wheel. In these embodiments, the effect wheel assembly further includes a plurality of rotating supports pivotally connected to the wheel body and a plurality of effect sheets, each effect sheet is arranged in the respect rotating support for intercepting the light beam to change the color and/or shape thereof. The effect areas are formed by the effect sheets, and the rotating support is driven to rotate by the driving wheel. In such configuration, the first flat motor can drive the effect sheet to revolve via the wheel body. In addition, the rotating support provided with the effect sheet can be driven to rotate as the second rotor of the second flat motor is connected to the driving wheel, each effect sheet thus can rotate on its own, thereby enriching the effect of the stage light fixture. For example, the wheel body may be a rotating pattern wheel or a prism wheel, namely, the effect sheet may be a pattern sheet or a prism.

In these embodiments, the first rotor includes a ring body and permanent magnets arranged on the ring body. The ring body is connected with a surrounding plate which is arranged outside the second rotor in a sleeving mode, and the wheel body is fixed on the top end of the surrounding plate. That is, the first flat motor is stacked with the second flat motor, the surrounding plate is arranged outside the second rotor in a sleeving mode, and the wheel body is fixed on the top end of the surrounding plate. In such configuration, the wheel body can be closer to the driving wheel, which thus can lower the height of the rotating support, thereby reducing the overall height of the flat-type effect module.

Specifically, the first stator includes a first core column and a first winding wound outside the first core column, and the second stator includes a second core column and a second winding wound outside the second core column. The first core column is preferably arranged with the second core column integrally. In such integral configuration of the first core column and the second core column, thickness of housings between the first flat motor and the second flat motor can be saved, resulting in more compact structure and lowered height.

Preferably, the first stator is connected with the first rotor via a bearing, and the second stator is connected to the second rotor via another bearing. Inner rings of the two bearings are supported by a support ring. The two bearings thus can be spaced from each other by the support ring, which can avoid rotation interaction between the first rotor and the second rotor.

According to at least one embodiment, a third flat motor can be further included, the third flat motor has a third stator which can generate a magnetic field when energized, and a third rotor which is arranged outside the third stator in a sleeving mode and can be driven by the magnetic field. The third stator is stacked with the first stator, and the third rotor is fixedly connected with another effect wheel assembly. In such way, the effect areas of the effect wheel assembly driven by the first flat motor and the another effect wheel assembly driven by the third flat motor can cooperate each other to produce more complex and varied effects.

The third rotor also includes a ring body and permanent magnets arranged on the ring body. The ring body is connected with a surrounding plate which is disposed outside the first rotor in a sleeving mode, and the effect wheel assembly is fixed on the top end of the surrounding plate. According to these embodiments, the first flat motor is stacked with the third flat motor, the surrounding plate is disposed outside the first rotor in a sleeving mode, and the effect wheel assembly is fixed on the top end of the surrounding plate. In such configuration, the two effect wheel assemblies can be much closer to each other, thereby achieving lowered overall height of the flat effect module.

Similarly, the first stator includes a first core column and a first winding wound outside the first core column, and the third stator comprises a third core column and a third winding wound outside the third core column. The first core column is preferably arranged with the third core column integrally. In such integral configuration of the first core column and the third core column, thickness of housings between the first flat motor and the third flat motor can be saved, resulting in more compact structure and lowered height.

Preferably, the first stator is connected with the first rotor via a bearing, the third stator is connected with the third rotor via another bearing. Inner rings of the two bearings are supported by a support ring. The two bearings thus can be spaced from each other through the support ring, which can avoid rotation interaction between the first rotor and the third rotor.

According to the present invention, the wheel body can be a fixed pattern wheel, a rotating pattern wheel, a color filter wheel, a prism wheel, a frosting wheel, a fire wheel or a CMY wheel, which can respectively project a fixed pattern, project a rotating pattern, change the color of the light beam, split light, homogenize the light beam, produce dynamic patterns and conduct color mixture.

On the other aspect, the present invention further provides a stage light fixture, which includes the flat-type effect module mentioned above and a light source for generating the light beam. Such flat-type effect module may take up less space in the stage light fixture, so that more effect elements can be arranged in the stage light fixture According to the present invention, the flat-type effect module can be fixed to a mounting plate which is provided with a light passing hole for the light beam of the light source to pass. The effect areas on the wheel body are arranged corresponding to the light passing holes, especially, the effect areas can be switched to a position corresponding to the light passing hole during rotation, so that the effect area can intercept the light beam passing out of the light passing hole to correspondingly change the color and/or shape thereof, the stage light fixture thus can generate bright and colorful light effects.

DETAILED DESCRIPTION

Figure 1:
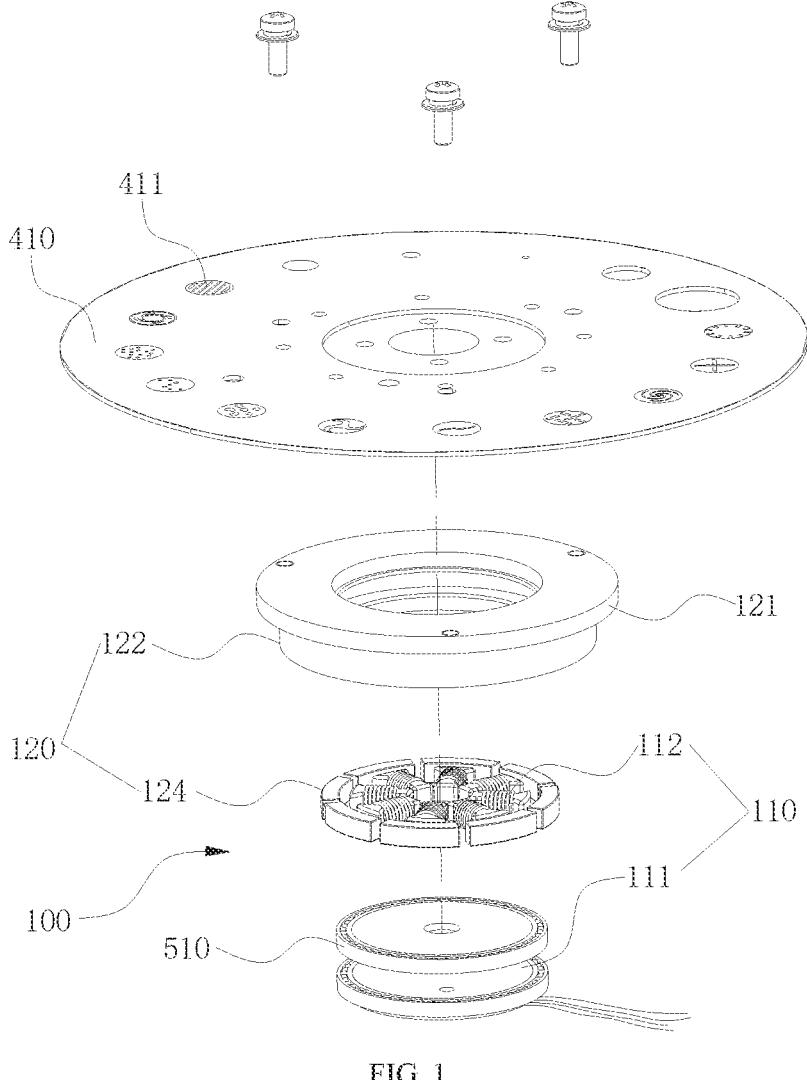
FIG. 1 is a schematic view of an exploded structure of a flat-type effect module according to one embodiment of the present invention.

The accompanying drawings are for exemplary illustration only, and should not be construed as limitations on the present invention; in order to better illustrate the present embodiment, some parts in the accompanying drawings may be omitted, enlarged or reduced, and they do not represent the size of the actual product; for those skilled in the art, it is understandable that certain well-known structures and descriptions thereof in the drawings may be omitted. The positional relationship described in the drawings is only for exemplary illustration, and should not be construed as limitations on this invention.

Figure 2:
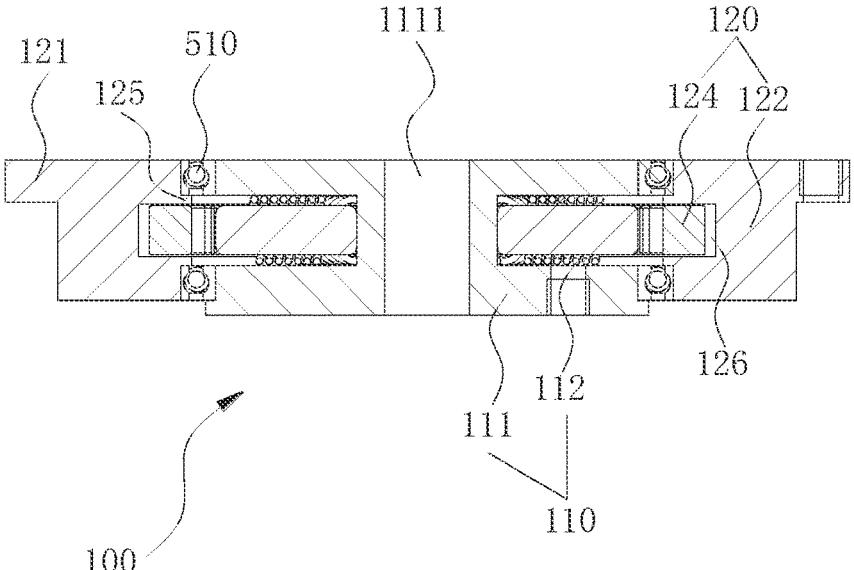
FIG. 2 is a schematic longitudinal sectional view of a first flat motor in FIG. 1
Figure 3:
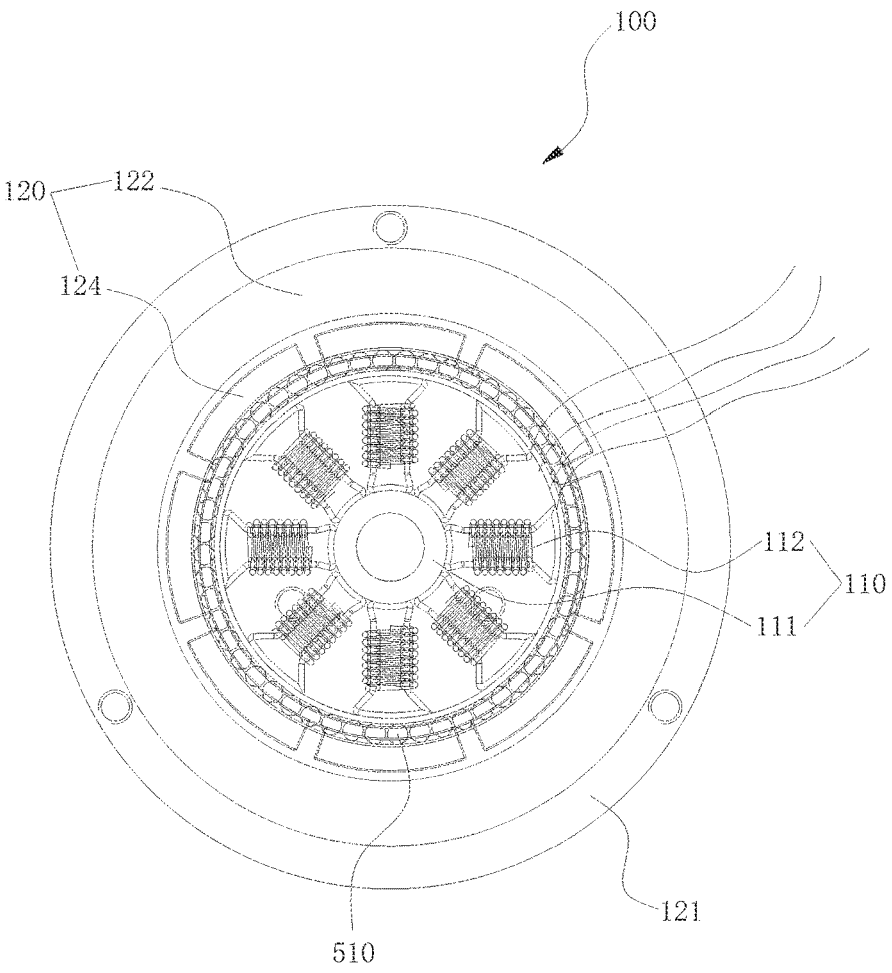
FIG. 3 is a schematic cross-sectional view of the first flat motor in FIG. 1.

Referring to FIG. 1 to FIG. 3, a flat-type effect module is provided according to one embodiment, which includes a first flat motor 100 and an effect wheel assembly driven by the first flat motor 100. The first flat motor 100 has a first stator 110 which can generate a magnetic field when energized, and a first rotor 120 which is arranged outside the first stator 110 in a sleeving mode and can be driven by the magnetic field. The effect wheel assembly is fixed to the first rotor 120. The effect wheel assembly includes a wheel body 410 for generating a light effect, and the wheel body 410 has a plurality of effect areas 411 for intercepting a light beam to change the color and/or shape thereof.

According to the flat-type effect module of the present embodiment, the first rotor 120 is arranged outside the first stator 110 in a sleeving mode, compared with a traditional rotating shaft motor, more permanent magnets 124 can be provided on the first rotor 120, so that even if the height of each permanent magnet 124 is reduced, power of the motor will not change as the number of the permanent magnets 124 increases, thereby achieving a reduction in the thickness of the motor itself, which will thus take up less height space. In addition, no rotating shaft, such as the traditional rotating shaft motor has, exists on the first flat motor 100, the effect wheel assembly according to the present embodiment is directly fixed to the first rotor 120, which can reduce the height of the rotating shaft. Therefore, with the configuration of the flat motor, the flat-type effect module according to the present embodiment has lowered height space, so that more effect wheels can be arranged at the focal position of a light source, thereby achieving richer light effects of the stage light fixture.

Optionally, the effect wheel assembly can be fixed on the end face of the first rotor 120. Such configuration can avoid the first rotor 120 protruding out of the effect wheel assembly to affect operation of other elements, which is easy to modular design.

According to the present embodiment, the wheel body 410 is preferably detachably fixed to the first rotor 120 through a screw.

In the present embodiment, the first stator 110 includes a first core column 111 and a first winding 112 wound outside the first core column 111. The first core column 111 having a through hole 1111 at the length direction. In such way, a cable for transmitting power or signals can pass through the through hole 1111, thus facilitating mounting and arranging of the cable.

Preferably, both the center line of the through hole 1111 and the center line of the first core column 111 coincide with the center line of rotation of the wheel body 41.

The first rotor 120 is provided a plurality of permanent magnets 124. The first winding 112 can be a plurality of coils opposite to the permanent magnets 124. The permanent magnets 124 are disposed transversely corresponding to the polarity of the coils, so that when the first winding 112 on the first stator 110 alternately changes the direction of current, the first rotor 120 with the permanent magnets 124 can be driven to rotate, in a similar principle as a general stepping motor.

According to the present embodiment, a raised edge 121 for supporting the effect wheel assembly is formed on the first rotor 120, and the outer diameter of the raised edge 121 is greater than the outer diameter of the first rotor 120. The effect wheel assembly is thus fixed on the raised edge 121, and the height of the effect wheel assembly can be flexibly adjusted by changing the position of the raised edge 121 without being limited to the end face of the effect wheel assembly. The outer diameter of the raised edge 121 is greater than the outer diameter of the first rotor 120, so that the effect wheel assembly can be fixed more stably and will be not prone to waggling relative to the first rotor 120.

The raised edge 121 can be located at the top end of the first rotor 120, forming a continuous shape.

In the present embodiment, the first rotor 120 supports the effect wheel assembly around the center of rotation of the effect wheel assembly. In such way, the first rotor 120 can support the effect wheel assembly around the center of rotation of the effect wheel assembly for one full circle, thus making the rotation of the effect wheel assembly smoother and more stable.

In the present embodiment, the wheel body 410 is directly fixed to the first rotor 120 and the first rotor 120 can drive the wheel body 410 to rotate on its own. The first rotor 120 drives the wheel body 410 to rotate on its own, so that different effect areas 411 or different parts of each effect area 411 on the wheel body 410 can intercept the light beam to generate different light effects. The wheel body 410 can be a fixed pattern wheel, a color wheel, a CMY wheel or a frosting wheel, so that the shape or color of the light beam can be changed, and various colors can be modulated by combining a plurality of CMY wheels.

Figure 4:
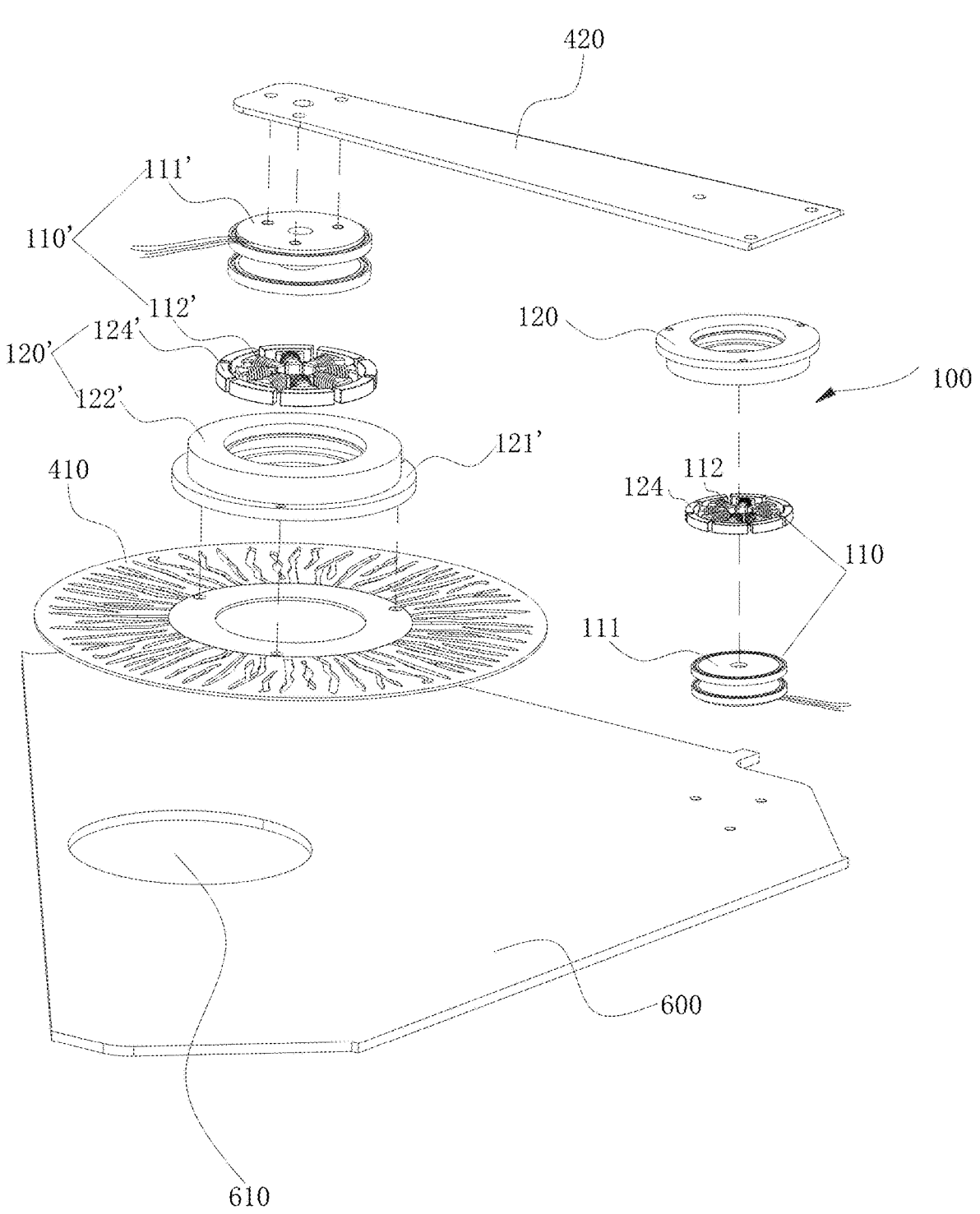
FIG. 4 is a schematic view of an exploded structure of a flat-type effect module according to another embodiment of the present invention.

According to some embodiments, as shown in FIG. 4, the effect wheel assembly can further include a bearing plate 420, the wheel body 410 is pivotally connected to the bearing plate 420, and the bearing plate 420 is fixed to the first rotor 120, so that the first rotor 120 can drive the wheel body 410 to revolve. In such configuration, the first rotor 120 can drive the wheel body 410 to move to different positions via the bearing plate 420, so that the wheel body 410 can be switched in/out of the light path, or different effect areas 411 or different parts of each effect area 411 on the wheel body 410 can intercept the light beam. For example, the wheel body 410 may be a fire wheel or a prism respectively generating effects of a dynamic pattern and splitting light.

In such embodiments, another first flat motor 100' is fixed to the bearing plate 420. The first flat motor 100' has a first stator 110' and a first rotor 120'. The first stator 110' includes a first core column 111' and a first winding 112' wound outside the first core column 111'. The first rotor 120' is provided a plurality of permanent magnets 124'. The wheel body 410 is fixed to the first rotor 120' of the first flat motor 100'. The first flat motor 100' can drive the wheel body 410 to rotate on its own. Especially, the two first flat motors 100, 100' are arranged on the two ends of the bearing plate, respectfully. The wheel body 410 combining with the additional first flat motor 100' also has the characteristics of small height, and smooth and stable rotation. With such configuration, the wheel body 410 can simultaneously achieve revolution and rotation on its own axis via the two first flat motors.

Figure 5:
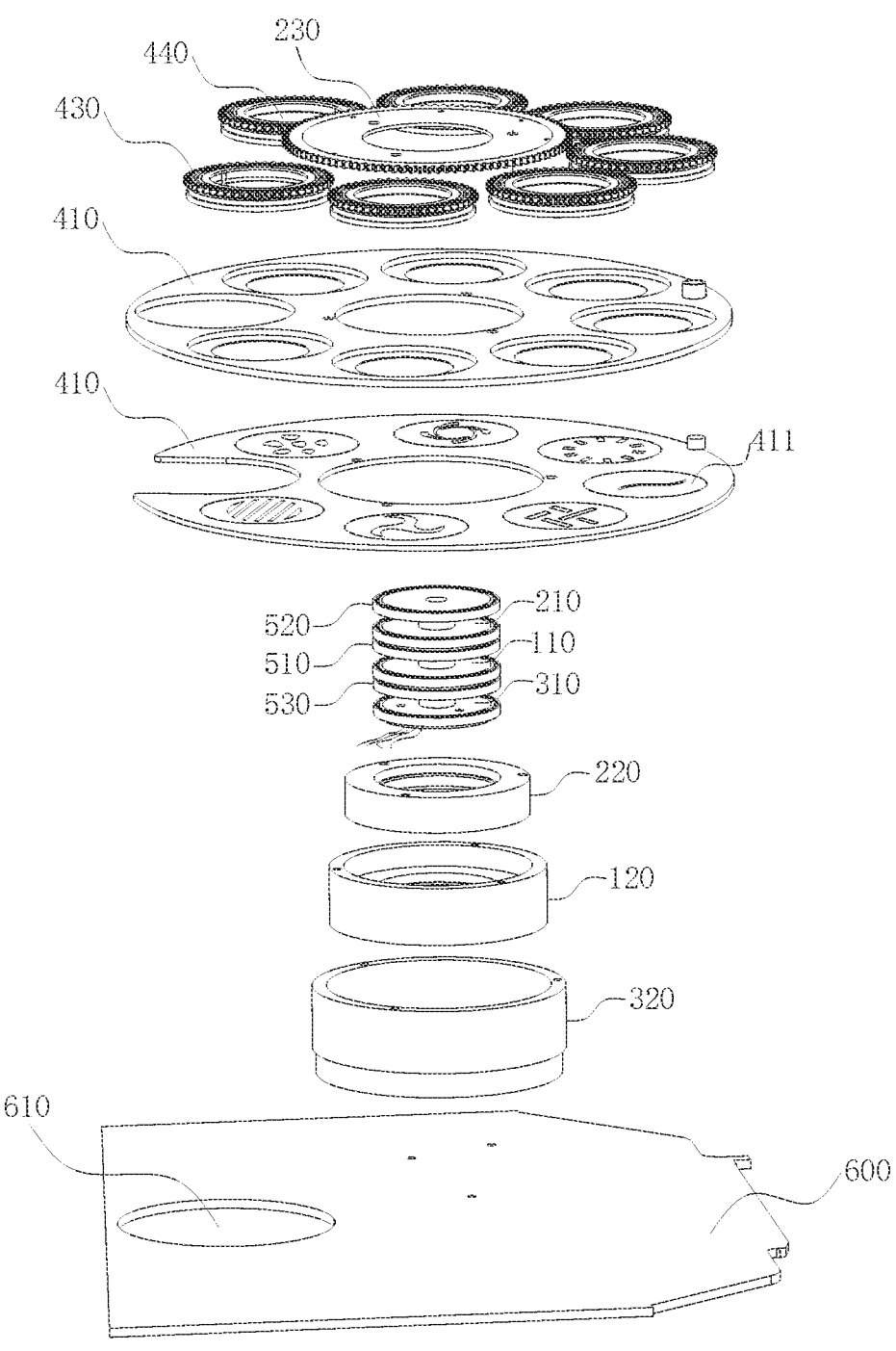
FIG. 5 is a schematic view of an exploded structure a flat-type effect module according to another embodiment of the present invention.
Figure 6:
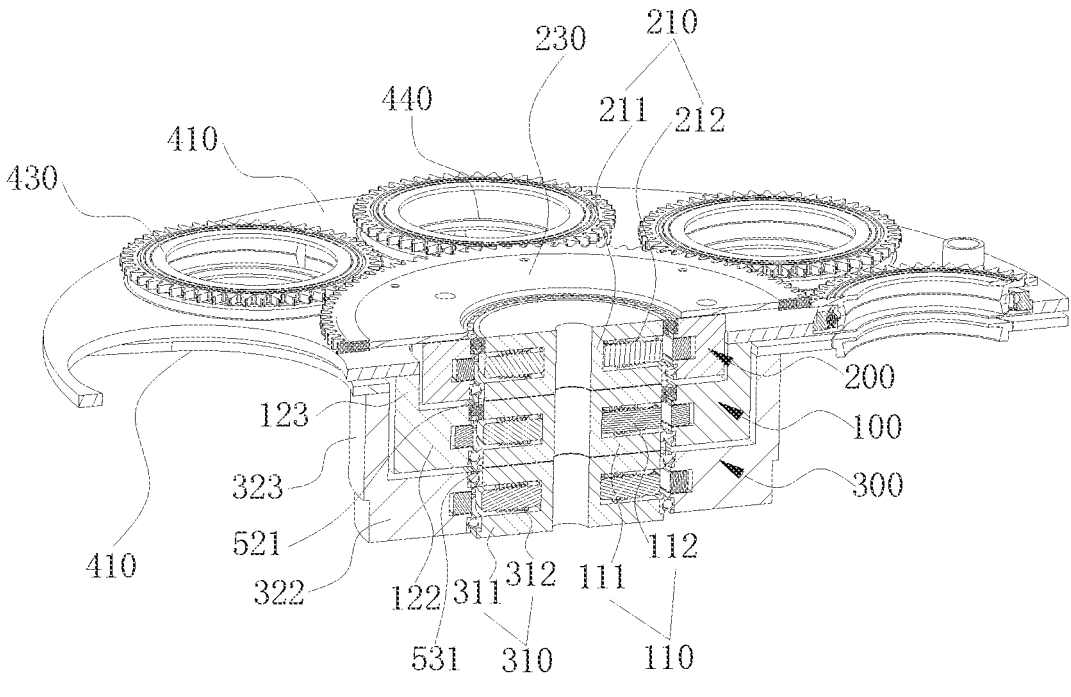
FIG. 6 is a schematic longitudinal sectional view of FIG. 5.

Referring to FIG. 5 and FIG. 6, a second flat motor 200 can be further included. The second flat motor 200 has a second stator 210 which can generate a magnetic field when energized, and a second rotor 220 which is arranged outside the second stator 210 in a sleeving mode and can be driven by the magnetic field. The second stator 210 is stacked with the first stator 110, and the second rotor 220 is connected to a driving wheel 230. The effect wheel assembly further includes a plurality of rotating supports 430 pivotally connected to the wheel body 410 and a plurality of effect sheets 440, each effect sheet is arranged in the respect rotating support 430 which is used for intercepting the light beams to change the color and/or shape thereof. The effect areas 411 are formed by the effect sheets 440, and the rotating support 430 is driven by the driving wheel 230. In such configuration, the first flat motor 100 can drive the effect sheet 440 to revolve via the wheel body 410. In addition, the rotating support 430 provided with the effect sheet 440 can be driven to rotate as the second rotor 220 of the second flat motor 200 is connected to the driving wheel 230, each effect sheet 440 thus can rotate on its own, thereby enriching the effect of the stage light fixture. For example, the wheel body 410 may be a rotating pattern wheel or a prism wheel, correspondingly, the effect sheet 440 may be a pattern sheet or a prism, respectively achieving the effects of rotation of patterns and rotation of light-split light beams.

Optionally, the rotating support 430 has a sawtooth edge which can be engaged with the driving wheel 230.

Referring to FIG. 6, the first rotor 120 includes a ring body 122 and permanent magnets 124 arranged on the ring body 122. The ring body 122 is connected with a surrounding plate 123 which is arranged outside the second rotor 220 in a sleeving mode, and the wheel body 410 is fixed on the top end of the surrounding plate 123. According to the present embodiment, the first flat motor 100 is stacked with the second flat motor 200, the surrounding plate 123 is arranged outside the second rotor 220 in a sleeving mode, and the wheel body 410 is fixed on the top end of surrounding plate 123. In such configuration, the wheel body 410 can be closer to the driving wheel 230, which can lower the height of the rotating support 430, thereby reducing the overall height of the flat-type effect module.

Specifically, the first stator 110 includes a first core column 111 and a first winding 112 wound outside the first core column 111. The second stator 210 includes a second core column 211 and a second winding 212 wound outside the second core column 211. The first core column 111 is preferably arranged with the second core column 211 integrally. In such integral configuration of the first core column 111 and the second core column 211, thickness of housings between the first flat motor 100 and the second flat motor 200 can be saved, thus resulting in more compact structure and lowered height.

Preferably, the first stator 110 is connected with the first rotor 120 via a first bearing 510, and the second stator 210 is connected with the second rotor 220 via a second bearing 520. Inner rings of the two bearings 510, 520 are supported by a support ring 521. The two bearings 510, 520 thus can be spaced from each other by the support ring 521, which can avoid rotation interaction between the first rotor 120 and the second rotor 220.

Optionally, the first stator 110 and the first rotor 120 can be connected via two first bearings 510. As FIG. 2 shown, the inner side of the first rotor 120 has a protruding portion 125, the two bearings 510 are respectively located at the upper and lower ends of the protruding portion 125, and an outer ring of the bearing 510 abuts against the protruding portion 125. The protruding portion 125 thus can support the outer ring of the bearing 510. With two bearings 510 arranged, on one hand, volume of each bearing 510 can be reduced, and on the other hand, processing errors of the two bearings 510 can be canceled out, the rotor thus will be not prone to waggling when fixed to the stator.

Optionally, the permanent magnets 124 are located between the two first bearings 510.

Optionally, the first rotor 120 is provided with grooves 126 corresponding to the permanent magnets 124.

Optionally, the end portions of the first stator 110 and the second stator 210 both have extending portions preventing the first bearing 510 from falling, and the extending portion is formed by punching press process.

Optionally, the first core column 111 and the second core column 121 each have a through hole 1111 in the length direction. A cable for transmitting power or signals can pass through the through hole 1111, thus facilitating mounting and arranging of the cable.

Referring to FIGS. 5 and 6, a third flat motor 300 can be further included according to some embodiments. The third flat motor 300 has a third stator 310 which can generate a magnetic field when energized, and a third rotor 320 which is arranged outside the third stator 310 in a sleeving mode and can be driven by the magnetic field. The third stator 310 is stacked with the first stator 110, and the third rotor 320 is fixedly connected with another effect wheel assembly. In such way, the effect areas of the effect wheel assembly driven by the first flat motor 100 and the effect wheel assembly driven by the third flat motor 300 can cooperate each other to produce more complex and varied effects.

The wheel bodies of the two effect wheel assemblies may be in same type, or can also be in different types according to actual demands. Such as the two wheel bodies can be both in form a fixed pattern wheel, a color wheel, a CMY wheel, a frosting wheel, a rotating pattern wheel or a fire wheel, or otherwise each of the wheel bodies may be a different one among them.

It can be conceivable that more flat motors may be included to provide more effect wheel assemblies.

As shown in FIG. 6, similar to the first rotor 120, the third rotor 320 also includes a ring body 322 and permanent magnets 324 arranged on the ring body 322. The ring body 322 is connected with a surrounding plate 323 which is disposed outside the first rotor 120 in a sleeving mode, and the effect wheel assembly is fixed on the top end of the surrounding plate 323. According to the present embodiment, the first flat motor 100 is stacked with the third flat motor 300 and the surrounding plate 323 is arranged outside the first rotor 120 in a sleeving mode and the effect wheel assembly is fixed on the top end of the surrounding plate 323. In such configuration, the two effect wheel assemblies can be much closer to each other, thereby achieving lowered overall height of the flat effect module.

In the present embodiment, the first stator 110 includes a first core column 111 and a first winding 112 wound outside the first core column 111. The third stator 310 includes a third core column 311 and a third winding 312 wound outside the third core column 311. The first core column 111 is preferably arranged with the third core column 311 integrally. In such integral configuration of the first core column 111 and the third core column 311, thickness of housings between the first flat motor 100 and the third flat motor 300 can be saved, resulting in more compact structure and lowered height.

The first core column 111 and the third core column 311 can each have a through hole 1111 in the length direction. A cable for transmitting power or signals can pass through the through hole 1111, facilitating mounting and arranging of the cable.

In the present embodiment, the first stator 110 is connected with the first rotor 120 via a first bearing 510, and the third stator 310 is connected with the third rotor 320 via a third bearing 530. Inner rings of the two bearings 510, 530 are supported by a support ring 531. The two bearings 510, 530 thus can be spaced from each other through the support ring 531, which can avoid rotation interaction between the first rotor 120 and the third rotor 320.

It can be conceivable that the first flat motor, the second flat motor and the third flat motor can be simultaneously provided to generate richer light effects, as shown in FIG. 5 and FIG. 6.

The wheel body 410 can be a fixed pattern wheel, a rotating pattern wheel, a color wheel, a prism wheel, a frosting wheel, a fire wheel or a CMY wheel, which can respectively project a fixed pattern, project a rotating pattern, change color of the light beam, split light, homogenize the light beam, produce dynamic patterns and conduct color mixture.

A stage light fixture is further provided according to one embodiment, which includes the flat-type effect module mentioned above and a light source for generating the light beam. Such flat-type effect module can take up less space in the stage light fixture, so that more effect elements can be arranged in the stage light fixture.

As shown in FIG. 4, the flat-type effect module can be fixed to a mounting plate 600 which is provided with a light passing hole 610 for the light beam of the light source to pass. The effect areas 411 on the wheel body 410 are arranged corresponding to the light passing hole 610, especially, the effect areas can be switched to a position corresponding to the light passing hole during rotation, so that the effect area 411 can intercept the light beam passing through the light passing hole 610 to correspondingly change the color and/or shape thereof, the stage light fixture thus can generate bright and colorful light effects.

Obviously, the above-mentioned embodiments of the present invention are only examples for clearly illustrating the present invention, rather than limiting the implementation modes of the present invention. For those of ordinary skill in the art, changes or modifications in other different forms can also be made on the basis of the above description. It is not needed and it is impossible to list all implementation modes here. Any modifications, equivalent replacements and improvements made within the spirit and principles of the present invention shall be included within the protection scope of the claims of the present invention.

The invention claimed is:

1. A flat-type effect module, comprising
a first flat motor, having a first stator which is configured to generate a magnetic field when energized and a first rotor which is arranged outside the first stator in a sleeving mode and is driven by the magnetic field; and
an effect wheel assembly fixed to an end face of the first rotor and driven by the first flat motor, comprising a wheel body for generating a light effect, wherein the wheel body has a plurality of effect areas for intercepting a light beam to change a color and/or shape thereof, and the plurality of effect areas are peripherally distributed outside the first rotor.

2. The flat-type effect module according to claim 1, wherein the first stator comprises
a first core column having a through hole in the length direction; and
a first winding, which is wound outside the first core column.

3. The flat-type effect module according to claim 1, wherein a raised edge for bearing the effect wheel assembly is formed on the first rotor, and an outer diameter of the raised edge is greater than an outer diameter of the first rotor.

4. The flat-type effect module according to claim 1, wherein the first rotor is configured to support the effect wheel assembly around a center of rotation of the effect wheel assembly.

5. The flat-type effect module according to claim 1, wherein the wheel body is directly fixed on the first rotor, and the first rotor is capable of driving the wheel body to rotate on its own.

6. The flat-type effect module according to claim 1, wherein the effect wheel assembly further comprises a bearing plate fixed to the first rotor, the wheel body is pivotally connected to the bearing plate, and the first rotor is capable of driving the wheel body to revolve.

7. The flat-type effect module according to claim 6, wherein another first flat motor is fixed to the bearing plate, and the wheel body is fixed to a first rotor of the another first flat motor.

8. The flat-type effect module according to claim 1, further comprising a second flat motor, having a second stator which is configured to generate another magnetic field when energized, and a second rotor which is arranged outside the second stator in a sleeving mode and is driven by the another magnetic field,
wherein the effect wheel assembly further comprises a rotating support pivotally connected to the wheel body and effect sheets disposed on the rotating support which are used for intercepting the light beam to change the color and/or shape thereof, and
wherein the second stator is stacked with the first stator, and the second rotor is connected to a driving wheel which is configured to drive the rotating support.

9. The flat-type effect module according to claim 8, wherein the first rotor comprises a ring body connected to a surrounding plate and permanent magnets arranged on the ring body, and wherein the surrounding plate is arranged outside the second rotor in a sleeving mode, and the wheel body is fixed on the top end of the surrounding plate.

10. The flat-type effect module according to claim 8, wherein the first stator comprises a first core column and a first winding wound outside the first core column, the second stator comprises a second core column and a second winding wound outside the second core column, and the first core column is arranged with the second core column integrally.

11. The flat-type effect module according to claim 8, wherein the first stator is connected to the first rotor via a bearing, the second stator is connected to the second rotor via another bearing, and inner rings of the two bearings are supported by a support ring.

12. The flat-type effect module according to claim 1, further comprising a third flat motor, having a third stator which is configured to generate another magnetic field when energized, and a third rotor which is arranged outside the third stator in a sleeving mode and is driven by another magnetic field, and
wherein the third stator is stacked with the first stator, and the third rotor is fixedly connected to another effect wheel assembly.

13. The flat-type effect module according to claim 12, wherein the third rotor comprises a ring body connected to a surrounding plate and permanent magnets arranged on the ring body, the surrounding plate is arranged outside the first rotor in a sleeving mode, and the another effect wheel assembly is fixed to the top end of the surrounding plate.

14. The flat-type effect module according to claim 12, the first stator comprises a first core column and a first winding wound outside the first core column, the third stator comprises a third core column and a third winding wound outside the third core column, and the first core column is arranged with the third core column integrally.

15. The flat-type effect module according to claim 12, the first stator is connected to the first rotor via a bearing, the third stator is connected to the third rotor via another bearing, and inner rings of the two bearings are supported by a support ring.

16. The flat-type effect module according to claim 1, wherein the wheel body is in form of a fixed pattern wheel, a rotating pattern wheel, a color filter wheel, a prism wheel, a frosting wheel, a fire wheel or a CMY wheel.

17. A state light, comprising the flat-type effect module according to claim 1 and a light source for generating a light beam.

18. The stage light according to claim 17, wherein the flat-type effect module is fixed to a mounting plate which is provided with a light passing hole for the light beam of the light source to pass, and effect areas of the wheel body are arranged corresponding to the light passing holes.

19. A flat-type effect module, comprising:
a first flat motor, having a first stator which is configured to generate a magnetic field when energized and a first rotor which is arranged outside the first stator in a sleeving mode and is driven by the magnetic field; and
an effect wheel assembly fixed to the first rotor and driven by the first flat motor, comprising a wheel body for generating a light effect, wherein the wheel body has a plurality of effect areas for intercepting a light beam to change a color and/or shape thereof,
wherein a raised edge for bearing the effect wheel assembly is formed on the first rotor, the wheel body being arranged on the raised edge, and an outer diameter of the raised edge is greater than an outer diameter of the first rotor.

20. The flat-type effect module according to claim 1, wherein the first rotor is configured to support the effect wheel assembly around a rotation center of the effect wheel assembly.

* * * * *